Aug. 28, 1962   J. R. BARTLOW   3,050,934
WATER COOLED EXHAUST ELBOW
Filed July 2, 1959
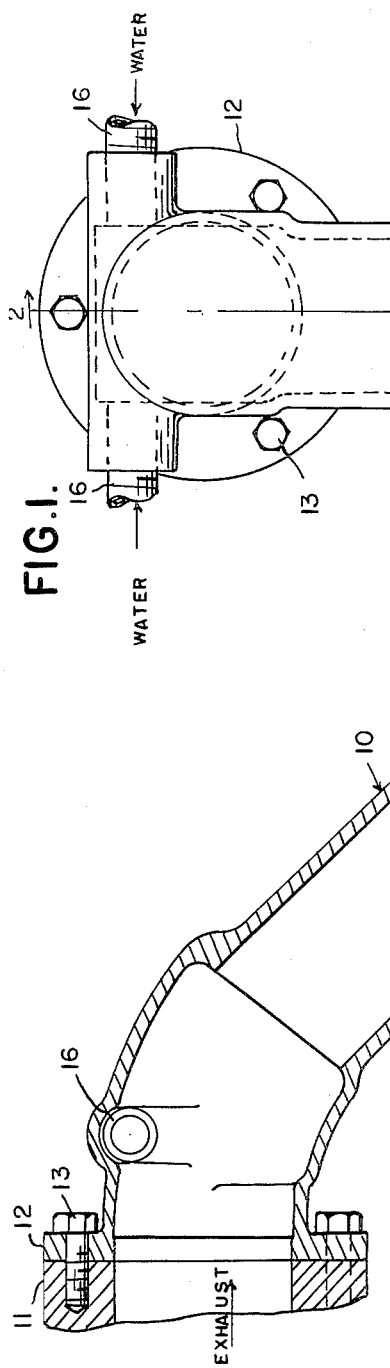
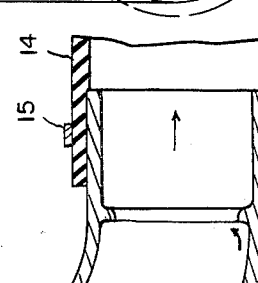
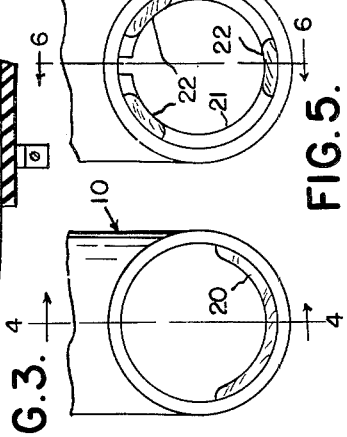
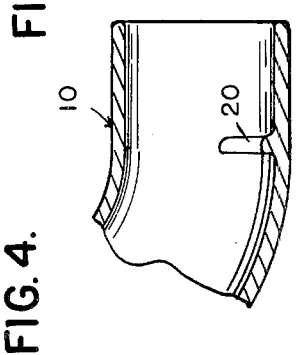
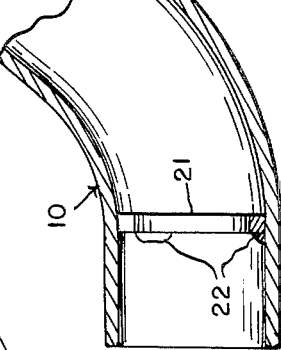
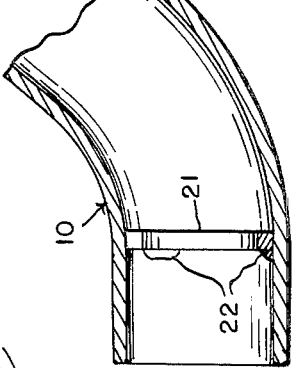
*INVENTOR.*
JACK R. BARTLOW
BY
ATTORNEYS 3,050,934
WATER COOLED EXHAUST ELBOW
Jack Robert Bartlow, Detroit, Mich., assignor to Gray Marine Motor Company, Detroit, Mich., a corporation of Michigan
Filed July 2, 1959, Ser. No. 824,511
4 Claims. (Cl. 60—30)

This invention relates to exhaust elbows and the like adapted for connection to internal combustion engines, and more particularly to an exhaust elbow for marine engines in which water or other coolant is introduced into the exhaust for cooling same.

In marine engines, water is generally introduced into the exhaust gases and in vaporizing therein is effective under normal operation to cool the gases so that they will not burn rubber hose connections. However, at speeds slightly above idling, when exhaust gas temperature within connecting hoses is highest, the velocity of the exhaust gases is decreased and the water, which is generally introduced by an engine operated pump into the upstream end of the exhaust elbow connecting the exhaust manifold with the tail pipe, flows through the pipe without becoming effectively vaporized. Also, at slower speeds, water flow is decreased. The hotter exhaust gases are thus not effectively cooled, and burning of rubber connecting hose results.

An object of the present invention is to ensure cooling of exhaust gases at all times by providing means for creating turbulence in the exhaust elbow to facilitate cooling of the exhaust.

Another object of the invention is to improve the cooling effect of coolant introduced into exhaust elbows by providing a deflector means operable to increase exhaust gas velocity and to force the coolant into the faster flowing gases.

For a more complete understanding of the invention, reference may be had to the accompanying drawing illustrating preferred embodiments of the invention in which like reference characters refer to like parts throughout the several views and in which FIG. 1 is an end elevational view of a preferred exhaust elbow embodying the invention.

FIG. 2 is a longitudinal cross-sectional view taken substantially on the line 2—2 of FIG. 1.

FIG. 3 is a fragmentary end view of an elbow embodying another modification of the invention.

FIG. 4 is a cross-sectional view taken substantially on the line 4—4 of FIG. 3.

FIG. 5 is a fragmentary end view of an elbow embodying yet another modification of the invention.

FIG. 6 is a cross-sectional view taken substantially on the line 6—6 of FIG. 5.

In FIGS. 1 and 2, an exhaust elbow structure 10 is adapted at one end for connection to the outlet of an exhaust manifold 11 by any means such as a flange 12 and studs or bolts 13. A rubber connecting hose 14 or the like is adapted for connection to the outlet end of the elbow 10 by any means such as a clamp 15. At the upstream end of the elbow 10 a pair of water or other coolant pipes 16 or the like are connected as shown. For convenience, the coolant is hereafter described as water although it is apparent other fluids are applicable.

The water is injected into the exhaust elbow 10 by the coolant pipes 16 substantially normal to the flow of exhaust gases as can best be seen in FIG. 1 where it is vaporized by the exhaust heat during normal engine operation and effectively cools the exhaust prior to discharge from the elbow. However, when the engine is idling, exhaust gas velocity often decreases to the point where it will not effectively come into contact with and vaporize the water, which then merely flows down and out of the elbow without appreciably cooling the exhaust.

To remedy this situation, a raised annular bead 16a is preferably cast into the inner surface of the elbow 10 near the discharge or downstream end. This bead, disposed preferably normal to the exhaust flow, has at least several purposes, all of which act to increase the cooling effect of the water on the exhaust gases.

First, the bead being disposed in the path of the exhaust gas, turbulence is created, which increases the tendency of the gases to break up the water flow to effectuate improved vaporization. Second, the restricting effect of the bead causes an increased exhaust gas velocity in this area, since the cross-sectional area of the passage is reduced, and the increased velocity gases tend to increase atomization, and consequently the cooling effect, of the water. Third, the bead imposes a restriction on water flow, the water being forced to climb up over the bead as indicated by the small directional arrows. The water is thus forced more into the direct path of the exhaust gases which tend to slice the water off the edge of the bead, increasing the atomization effect.

In FIGS. 3 and 4 a modified form of arcuate bead 20 is illustrated as being disposed at the lowermost portion of the pipe, so that the third purpose mentioned above will be operative although turbulence and velocity will not be as effective as in the modification of FIGS. 1 and 2.

In FIGS. 5 and 6, a ring element 21 is used in place of a bead, the ring element 21 being welded as at 22 in three places or otherwise secured to the inner surface of the elbow 10.

Although only a few embodiments of the invention are described, it will be apparent to one skilled in the art to which the invention pertains that various changes and modifications may be made therein without departing from the spirit of the invention or the scope of the appended claims.

I claim:

1. An exhaust elbow for marine engines comprising a pipe structure having an inlet end adapted for connection with the exhaust manifold of an internal combustion engine, said structure having an intermediate downwardly sloping section and terminating in an outlet disposed at a level lower than the inlet end thereof, means introducing a liquid coolant into said pipe structure adjacent the inlet end and generally normal to the flow of exhaust gases, and a deflector at the outlet end of said pipe structure and operable to accentuate vaporization of the coolant in said exhaust gases at engine idling speeds and at speeds slightly above idling to provide effective cooling of said exhaust gases prior to exhaust from said pipe structure.

2. An exhaust elbow for marine engines as defined in claim 1 in which said deflector comprises a raised annular bead on the inner surface of said pipe.

3. An exhaust elbow for marine engines as defined in claim 2 in which said raised annular bead is disposed generally in a plane normal to the axis of the pipe.

4. An exhaust elbow for marine engines as defined in claim 1 in which said deflector comprises an arcuate bead on substantially the lower half of the inner surface of said pipe.

References Cited in the file of this patent
UNITED STATES PATENTS

| 799,013 | Moffitt | Sept. 5, 1905 |
| 1,131,862 | Perkins | Mar. 16, 1915 |
| 2,174,626 | Fogas | Oct. 3, 1939 |
| 2,409,496 | Kelley | Oct. 15, 1946 |
| 2,461,580 | Wiczer et al. | Feb. 15, 1949 |

FOREIGN PATENTS

| 97,143 | Switzerland | Dec. 16, 1922 |